United States Patent [19]

Ricciardi

[11] Patent Number: 4,643,582

[45] Date of Patent: Feb. 17, 1987

[54] WETTING CHAMBER

[75] Inventor: Ronald J. Ricciardi, Moonachie, N.J.

[73] Assignee: Acrison, Inc., Moonachie, N.J.

[21] Appl. No.: 785,520

[22] Filed: Oct. 8, 1985

[51] Int. Cl.[4] .......... B01D 47/00; B67D 5/54; B01F 15/00

[52] U.S. Cl. .......... 366/102; 55/233; 222/195; 239/311; 239/318; 239/421; 366/154; 366/165; 366/178

[58] Field of Search .......... 366/101, 102, 107, 148, 366/154, 165, 173, 177, 178, 186, 603; 222/195; 239/318, 421, 311; 55/233, 257 R, 90

[56] References Cited

U.S. PATENT DOCUMENTS

| | | | |
|---|---|---|---|
| 1,157,092 | 10/1915 | DuRell . | |
| 2,746,728 | 5/1956 | Pomerleau | 239/421 |
| 3,434,698 | 3/1969 | Smith et al. | 366/101 |
| 3,809,436 | 5/1974 | Ciaffone . | |
| 3,819,157 | 6/1974 | Markfelt . | |
| 3,928,669 | 1/1967 | Zingg | 366/107 |
| 4,077,612 | 3/1978 | Ricciardi | 366/102 |
| 4,086,663 | 4/1978 | Croft | 366/154 |
| 4,352,718 | 10/1982 | Grun . | |

FOREIGN PATENT DOCUMENTS 97152 12/1973 Japan .

*Primary Examiner*—Timothy F. Simone
*Attorney, Agent, or Firm*—Davis, Hoxie, Faithfull & Hapgood

[57] ABSTRACT

The present invention provides a new wetting chamber for a metering and wetting system typically for polyelectrolyte polymer. Atmospheric air is used to disperse the polymer fed into the chamber by a suitable feeder and to generate air/water turbulence in the wetting chamber in which the polymer is wetted. Suction draws the metered polymer into the wetting chamber and increases the downward velocity of the polymer as it enters the turbulent section of the wetting chamber. When wetted, the polymer is transferred to a mixing tank for aging. It is then ready for use in various industries.

7 Claims, 3 Drawing Figures

WETTING CHAMBER

BACKGROUND OF THE INVENTION

This invention relates to metering and wetting systems for dry materials and is particularly adapted, inter alia, for wetting polyelectrolytes or the like. Polyelectrolytes are polymers which have been found effective in promoting coagulation and are often used in waste water treatment.

Handling of polyelectrolytes is difficult because of their hygroscopic nature and the difficulties involved in properly wetting them and bringing them into solution. Polymers such as polyelectrolytes require from about 5 to about 60 minutes to "age" after they have been properly wetted, to transfer into solution. It might appear that a very simple method of wetting a polyelectrolyte would be to meter the polymer directly into a tank and mix it with a mixer. However, because of its extremely hygroscopic nature, if one added a clump of polyelectrolyte to a bucket of water, the outer portion of this clump would wet instantaneously upon contact with the water, preventing the center core of the clump from being wetted. The wetted outer area then would become a viscous shell and would isolate the still dry, encapsulated material. In fact, it is very difficult for liquid to penetrate the outer wetted shell to wet the dry material encapsulated therein. These unwetted particles or globules are generally known in the trade as "fisheyes." Even mechanical mixers have difficulty in breaking down these lumps, particularly within the period of time required for the aging process or within allocated process time requirements.

Thus, it is essential that every grain of polyelectrolyte be wetted in order for a polymer metering/wetting system to be completely functional.

Another serious handling problem derives from the extremely adhesive nature of improperly wetted polymer. The unwetted or partially wetted polyelectrolyte globules will adhere to practically any surface with which they come in contact. Therefore, when a polyelectrolyte solution which contains unwetted or partially wetted particles is transported, there is a tendency for these particles to agglomerate and adhere to each other and to the inside of the pipes, creating a serious problem. Thus, if a polyelectrolyte solution containing these unwetted particles is permitted to pass through pipelines, pumps, etc., clogging may result very quickly, rendering the system useless. On the other hand, a properly wetted polyelectrolyte solution does not cause any handling problems per se.

My U.S. Pat. No. 4,077,612 is also directed to the problem of wetting polyelectrolytes. The present invention differs from that of the '612 patent in at least two major aspects. First, the present invention does not utilize an air dryer, and second, it does not utilize a dry air/polymer atomizing system. The system of the present invention is less costly to manufacture and is smaller in size than the system disclosed by the '612 patent.

In the system of the '612 patent, the polyelectrolyte is first atomized with dry air and is then conveyed via a pneumatic conveying line to a mixing-wetting chamber where wetting occurs. In that system it is important that the air be substantially moisture-free (col. 4, lines 16–18) because if the atomized polyelectrolyte contains moisture, it will adhere to the surfaces of the system.

The current invention, by contrast, is simpler and more convenient in that the air need not be dry, and therefore atmospheric air may be used. The present invention also abrogates the need for any pneumatic conveying line because of the different kind of wetting chamber used. The atmospheric air used to disperse the polymer simultaneously creates air/water turbulence in the lower part of the wetting chamber. The polymer is not atomized or otherwise dispersed before it enters the wetting chamber. It is simply fed into the inlet of the wetting chamber where it is drawn in by gravity aided by an eductor effect. This is also simpler and more convenient than the procedure disclosed in the '612 patent.

SUMMARY OF THE INVENTION

The present invention provides a new wetting chamber for a metering and wetting system for polyelectrolyte polymer. According to one aspect of the invention, the wetting chamber of the system is vertically disposed and has an upper conical portion, a middle cylindrical portion and a lower conical portion. The upper portion is actually formed of two concentrically arranged conical sections with a space between them that narrows in the downward direction. The product enters the inner conical section axially, through the open top of the wetting chamber. A controlled quantity of water enters within the inner conical section tangentially, through an inlet near the top of the upper portion and at about a 90° angle with respect to the product inlet. This water acts as a water blanket, flooding the internal surfaces of the inner conical section and preventing any polyelectrolyte from adhering to it. Air also enters the upper portion of the wetting chamber, but separately from the water, radially, into the space between the two conical sections, below the first water inlet, and swirls downward in turbulent flow in the space between the conical sections. A second water inlet tangentially enters the middle cylindrical portion of the wetting chamber. A controlled quantity of water enters tangentially through this inlet in the same direction as the water in the first water inlet. When this water combines with the air exiting from the narrowing space between the conical sections of the upper portion, cyclonic turbulent action commences. When the dry material exiting from within the inner conical section together with the water blanket comes in contact with this water/air turbulence, thorough wetting of the polyelectrolyte polymer occurs in the lower portions of the chamber. The wetted polyelectrolyte then enters a mixing tank for subsequent aging, processing and use.

Several aspects of the invention are shown in the accompanying drawings, forming a part of the specification, wherein.

DETAILED DESCRIPTION

Figure 2:
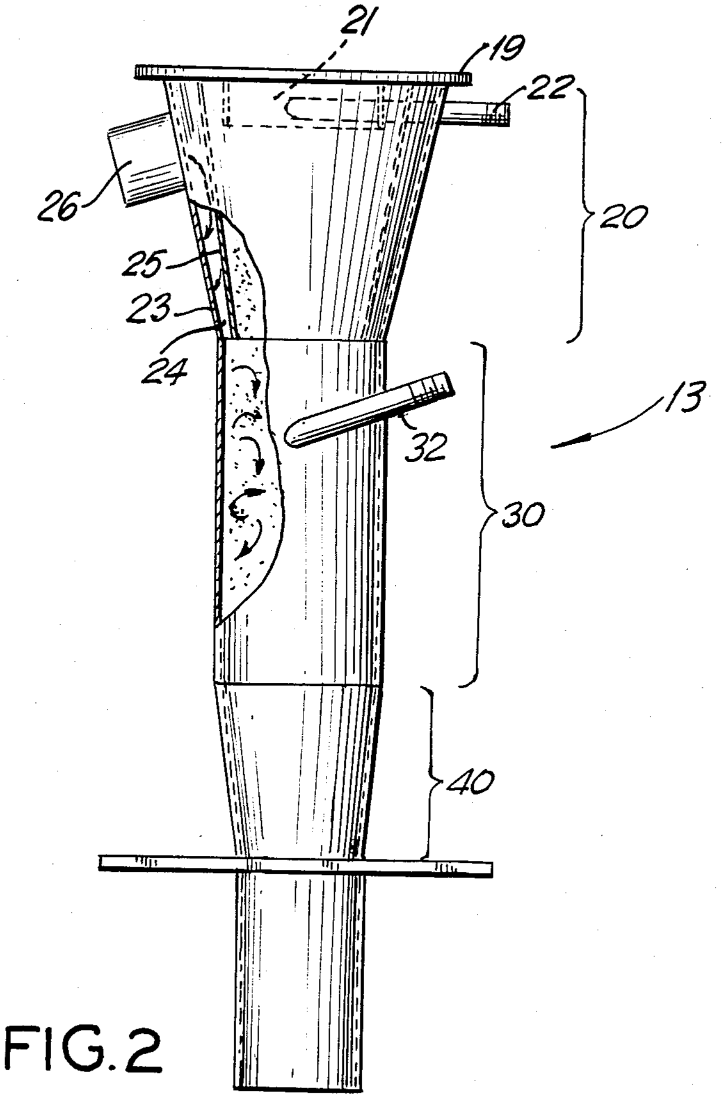
FIG. 2 is a medial, vertical sectional view of a wetting chamber of the system.

In the embodiment of the invention illustrated in the figures, the system for metering and wetting polyelectrolyte materials comprises a feeder hopper 11, into which polyelectrolyte may be loaded, adjacent to volumetric feeder 12 which accurately meters the material at a preset rate. The discharge of the volumetric feeder meters the material downward into the top of wetting chamber 13 by way of open axial inlet 21. In this embodiment of the invention, as shown particularly in FIG. 2, wetting chamber 13 of the system is vertically disposed and has an upper conical portion 20, a middle cylindrical portion 30 and a lower conical portion 40.

The upper portion 20 is formed of two concentrically arranged inverted conical sections 23 and 25, arranged about a longitudinal axis, and having an annular space 24 between them. Because the inner conical section 25 has a smaller vertex angle than the outer section 23, the space between them narrows in the downward direction. The space 24 is closed at the top by ring 19. A controlled quantity of water enters within the inner conical section tangentially, nearly horizontally, through a first water inlet 22 near the top of the upper portion 20 and at about a 90° angle with respect to inlet 21. This water acts as a water blanket, flooding the internal surfaces of the inner conical section, and prevents the possibility of polymer adhering to any internal part of the wetting chamber. Such adhesion would result in clogging, ineffective wetting, or both. The water is under a centripetal force when it exits at the bottom of inner cone 25.

Figure 1:
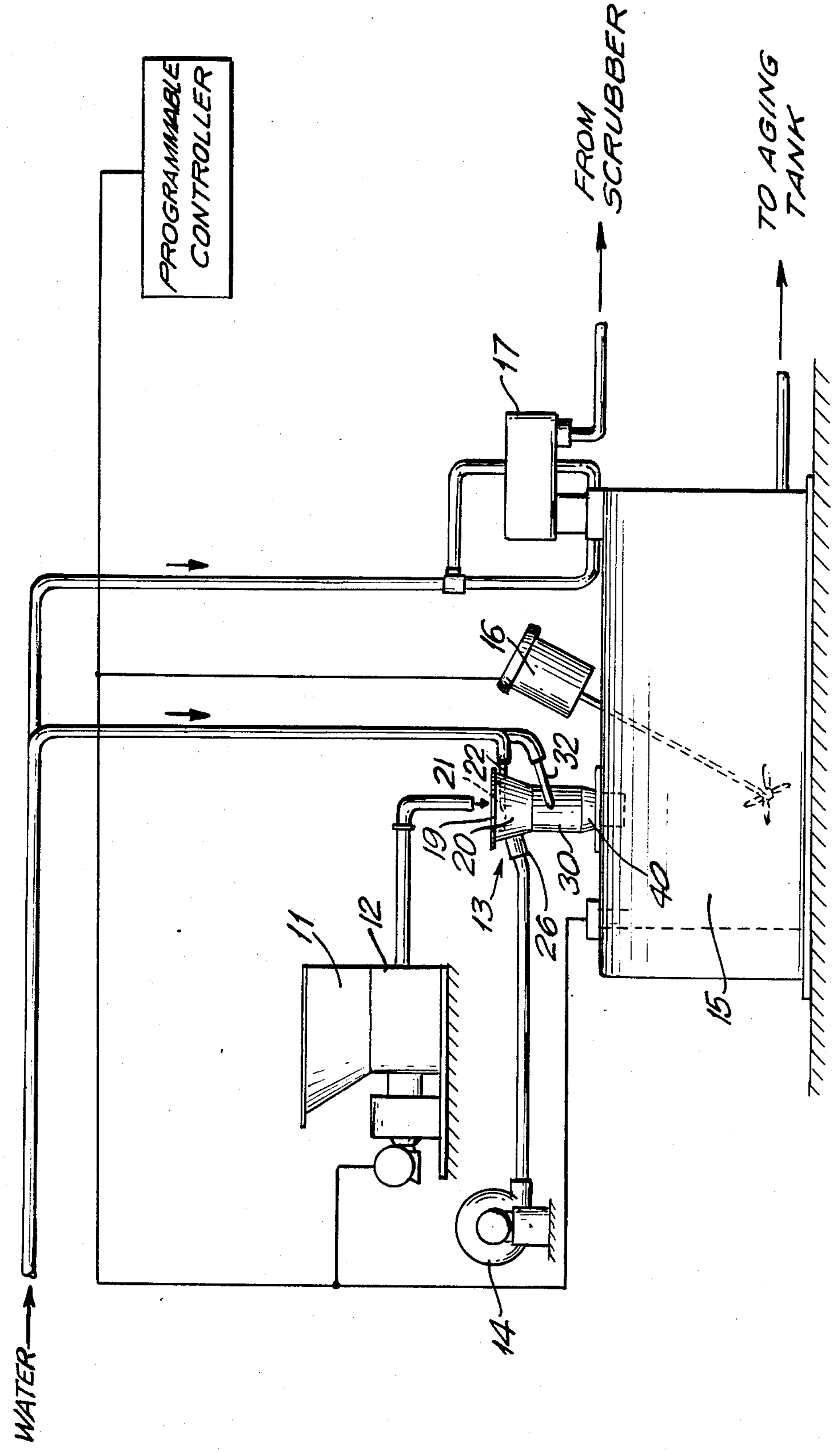
FIG. 1 is a schematic view of a system for metering and wetting polyelectrolyte, constructed according to the concepts of the invention.
Figure 3:
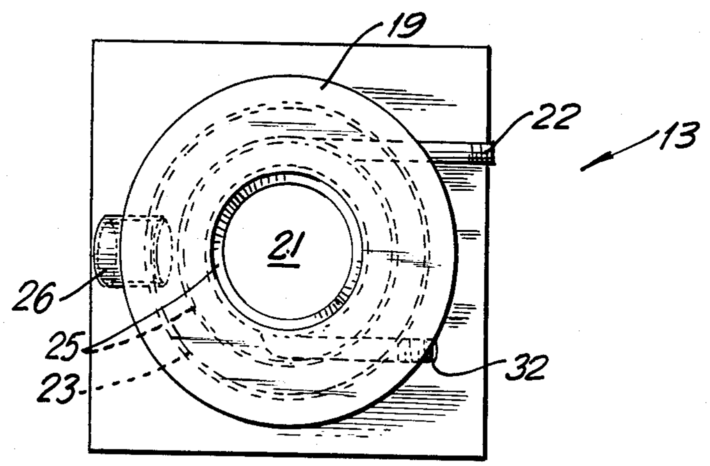
FIG. 3 is a sectional view taken along the top of FIG. 2.

Pressurized air from blower 14 (shown in FIG. 1), which need not be dry and may be in fact atmospheric, radially enters the upper conical portion 20 of the wetting chamber into the space between the two conical sections 23 and 25, below the first water inlet 22, at about a 100° angle from inlet 21, at air inlet 26. The air separates when it hits the inner cone 25, and swirls downward in turbulent flow in the annular space 24 between the conical sections, exiting from the annular opening at the bottom of space 24. The action of this air in rushing out of the bottom opening of 24, under the influence of blower 14 creates a suction at the wetting chamber inlet 21, assisting the force of gravity in drawing polymer into the middle portion 30 of the wetting chamber.

A second controlled quantity of water tangentially enters the middle portion 30 of the wetting chamber at a second water inlet 32 at about an 85 angle from the inlet 21. This water enters tangentially in the same direction as the water entering the first water inlet 23. When water from second water inlet 32 combines with the pressurized air exiting from the narrowing space 24 between the conical sections 23 and 25 of upper portion 20, cyclonic turbulent action commences. When the dry polyelectrolyte exiting from within the inner conical section 25 together with the water blanket comes in contact with this water/air turbulence, thorough wetting occurs. It is in this manner that the air simultaneously generates air/water turbulence, and disperses the polymer. The dispersion and contact of each polymer particle with water due to this turbulence ensures the complete and thorough wetting of polymer without clumping, agglomeration or "fisheyes".

The completely wetted polymer then drops through and out of lower portion 40 into mixing tank 15 (FIG. 1) where a slow speed mechanical mixer 16 facilitates dissolving without causing damage to the polymer chain. The slight taper of lower portion 40 creates some back pressure in middle portion 30, and this back pressure promotes turbulent mixing.

In a preferred embodiment of the invention, the total height of the wetting chamber 13 is approximately eighteen inches, with the upper conical portion 20 approximately seven inches in diameter at the top. The central cylindrical portion 30 is approximately three inches in diameter and the annular space 24 between outer and inner cones 23 and 25 is approximately ⅛ inch. The total water flow through the wetting chamber is preferably at a rate of about eleven gallons per minute, although the system can operate through a range of five to twelve gallons per minute. It is to be noted that in this preferred embodiment, the two water flows are not equal. Most of the water enters at second water inlet 32, in the middle portion of the mixing chamber. The smaller amount of water entering at 22 is primarily for the purpose of washing the sides of the chamber and preventing adherence of polymer. Air enters the wetting chamber radially at a pressure of less than a pound. Blower 14 is capable of 45 cfm at three pounds of pressure, but since the system requires only less than one pound, it operates at a higher cfm value.

The metering and wetting system is equipped with an air scrubber assembly indicated generally at 17. The scrubber ensures that a downward suction or eductor effect exists at inlet 21 of the wetting chamber by overcompensating for air entering mixing tank 15 from blower 14 which inputs air into the chamber through air inlet 26. In addition, the scrubber will "scrub" any residual polymer dust that may have escaped the wetting process within the wetting chamber. Since very little, if any, polymer dust escapes through the wetting chamber, the major purpose of the scrubber is to ensure a negative draw at the polyelectrolyte inlet of the wetting chamber.

Although particular embodiments of the invention are disclosed here for purposes of explanation, various adaptations and modifications of the invention will be apparent to those skilled in the art to which the application pertains. This disclosure should be regarded as including such equivalent systems and processes.

I claim:

1. A wetting chamber for a system for wetting hygroscopic materials comprising:

(a) an upper portion comprising two inverted conical sections concentrically arranged about a longitudinal axis, the vertex angle of the inner conical section being smaller than the vertex angle of the outer conical section so that the space between them narrows in the downward direction;

(b) a closure for sealing the space between the conical sections at the top of the upper portion;

(c) means for axially introducing material into the inner conical section at the top of the upper portion;

(d) means for flooding the internal surface of the inner conical section with water to prevent the material from adhering to the internal surface, the water from the flooding means accomplishing only a minor portion of the wetting;

(e) means for injecting pressurized air into the space between the sections;

(f) a cylindrical second portion attached to the lower end of the outer conical section; and (g) means for injecting water tangentially into the cylindrical portion at a position near the top of the cylindrical portion, the water from the injecting means accomplishing a major portion of the wetting.

2. A wetting chamber according to claim 1 wherein said means for flooding the internal surface of the inner conical section with water comprises a first tangential inlet extending through the inner section and oriented such that water enters within the inner section in the same direction as the water injected tangentially into the cylindrical portion.

3. A wetting chamber according to claim 1 wherein the means for axially introducing material comprises an open axial inlet at the top of the wetting chamber.

4. A wetting chamber according to claim 2 wherein the inlet is located near the top of the first portion and oriented at about a 90° angle with respect to the longitudinal axis of the two conical sections.

5. A wetting chamber according to claim 1 wherein said means for injecting pressurized air comprises a blower forcing air radially into the space through an air inlet at about a 100° angle with respect to the longitudinal axis of the two conical sections.

6. A wetting chamber according to claim 1 wherein said means for injecting water into the second portion comprises a second tangential water inlet extending through the cylinder wall and directed at about an 85 angle with respect to the longitudinal axis of the two conical sections.

7. The wetting chamber according to claim 1 further including a tapered conical portion attached to the lower end of the cylindrical portion.

* * * * *